United States Patent [19]

Rhodes et al.

[11] 4,434,606
[45] Mar. 6, 1984

[54] GEAR BOX FOR CORN HARVESTING UNIT

[75] Inventors: Lawrence G. Rhodes; John W. Carter, both of Stockton, Mo.

[73] Assignee: Superior Gear Box Company, Stockton, Mo.

[21] Appl. No.: 374,705

[22] Filed: May 4, 1982

[51] Int. Cl.³ .................. A01D 47/00; F16H 37/06
[52] U.S. Cl. .................. 56/106; 56/14.2; 74/665 GD; 74/410; 74/425
[58] Field of Search .................. 56/13.5, 14.1, 14.2, 56/104, 105, 106, DIG. 6, 111, 11.2; 74/665 G, 665 GD, 410, 425

[56] References Cited

U.S. PATENT DOCUMENTS

| 2,554,198 | 5/1951 | Kuhlman | 56/106 |
| 2,694,281 | 11/1954 | Beck | 56/14.2 |
| 3,589,110 | 6/1971 | Schreiner | 56/11.7 |
| 3,858,384 | 1/1975 | Maiste et al. | 56/14.2 |
| 4,244,162 | 1/1981 | Pucher | 56/14.2 |

FOREIGN PATENT DOCUMENTS

1092746  4/1955  France .................. 74/665 GD

*Primary Examiner*—Gene Mancene
*Assistant Examiner*—John Weiss
*Attorney, Agent, or Firm*—Cohn, Powell & Hind

[57] ABSTRACT

This compact gear box is intended for a corn harvesting unit having a pair of harvesting rolls and a pair of gathering chain assemblies. The gear box includes a drive shaft and first and second pairs of shafts connected to the harvesting rolls and the gathering chain assemblies respectively. The drive shaft includes a bevel gear driving a bevel pinion gear mounted to the end of each of the first pair of shafts to rotate the harvesting rolls. The first shafts each include worm gears and the second shafts each include worm wheels engageable by associated worm gears of the first pair of shafts to rotate the gathering chain assemblies.

12 Claims, 10 Drawing Figures

GEAR BOX FOR CORN HARVESTING UNIT

BACKGROUND OF THE INVENTION

This invention relates generally to a compact gear box and particularly to a gear box for use with a corn harvesting unit.

Corn harvesting assemblies which are used as an attachment for combine harvesters are well known. Such assemblies typically include a set of adjustable corn harvesting units and are generally attached to the front end of the combine. The assembly is driven by power supplied by the combine and each unit includes a corn harvesting roll assembly and a gathering chain assembly.

Harvesting units of the type under consideration are shown generally in U.S. Pat. No. 3,520,121 and U.S. Pat. No. 3,589,110. The former patent discloses a harvesting unit having a double drive shaft system having separate drive shafts for the harvesting roll assembly and the gathering chain assembly. The latter patent discloses a harvesting unit having a single drive shaft system and a gear box which transmits power to both the harvesting roll assembly and the gathering chain assembly. In U.S. Pat. No. 3,589,110 the gears within the gear box are arranged essentially in two tiers and this arrangement, in addition to utilizing a greater number of gear box components, results in a particularly heavy and large gear box unit.

The above disadvantages are overcome in the present gear box in a manner not disclosed in the known prior art.

SUMMARY OF THE INVENTION

This gear box is intended particularly for use with combine harvester corn harvesting units of the type having harvesting rolls and chain gathering assemblies and provides a simplified gear train which results in a compact, lightweight gear box.

The compact gear box includes front and rear portions and opposed side portions. A drive shaft having an axis of rotation transversely disposed to the axes of the harvesting rolls is rotatably mounted in the rear end portion of the said shaft having bevel gear means mounted thereon. A first pair of shafts is rotatively mounted in spaced parallel relation within the gear case, said shafts having axes of rotation longitudinally aligned with associated axes of the harvesting rolls, each of the shafts including a rear end provided with bevel gear means drivingly engageable with the bevel gear means of the drive shaft, a front end, and an intermediate portion having worm gear means mounted thereon for rotation therewith. Connection means is provided connecting the harvesting rolls to the first shafts. A second pair of shafts is rotatively mounted in spaced parallel relation within the gear case, said shafts having axes of rotation transversely disposed to the axes of rotation of the harvesting rolls, each of said shafts being mounted in one of said gear case side portions and including a lower end supported by the gear case in thrust bearing relation, an upper end extending outwardly of the housing and connected to the gathering chain assembly, and an intermediate portion having worm wheel means mounted thereon and engageable with the associated worm gear means of one of said first pair of shafts.

In one aspect of the invention, the gear case front, rear and side portions define a generally cruciform configuration.

In another aspect of the invention, the gear case includes upper and lower halves, which are substantially identical except for the mounting of the second pair of shafts.

In yet another aspect of the invention the gear case lower half includes an inner mounting boss receiving and supporting the lower end of second shafts and the gear case upper half includes inner and outer mounting bosses receiving the second shafts therethrough.

In still another aspect of the invention the worm gear means of the first shafts and the worm wheel means of the second shafts are of substantially the same diameter.

In another aspect of the invention the first shafts are substantially hollow to include a longitudinal passage and are supported at longitudinally spaced points of support within the gear case, and the means connecting the first shafts to the harvesting rolls include a pair of harvesting roll shafts received by the passage of the first shafts.

In still another aspect of the invention the first shafts are disposed substantially within the gear case.

In yet another aspect of the invention the drive shaft bevel gear means includes a double bevel gear.

In another aspect of the invention the velocity ratio between the drive shaft and the first shafts is 1:2 and the velocity ratio between the drive shaft and the second shafts is 3.8:1.

In yet another aspect of the invention the drive shaft the first shaft lie in a common plane to provide a single tier of shafts driving the second shafts.

DESCRIPTION OF THE PREFERRED EMBODIMENT

Figure 1:
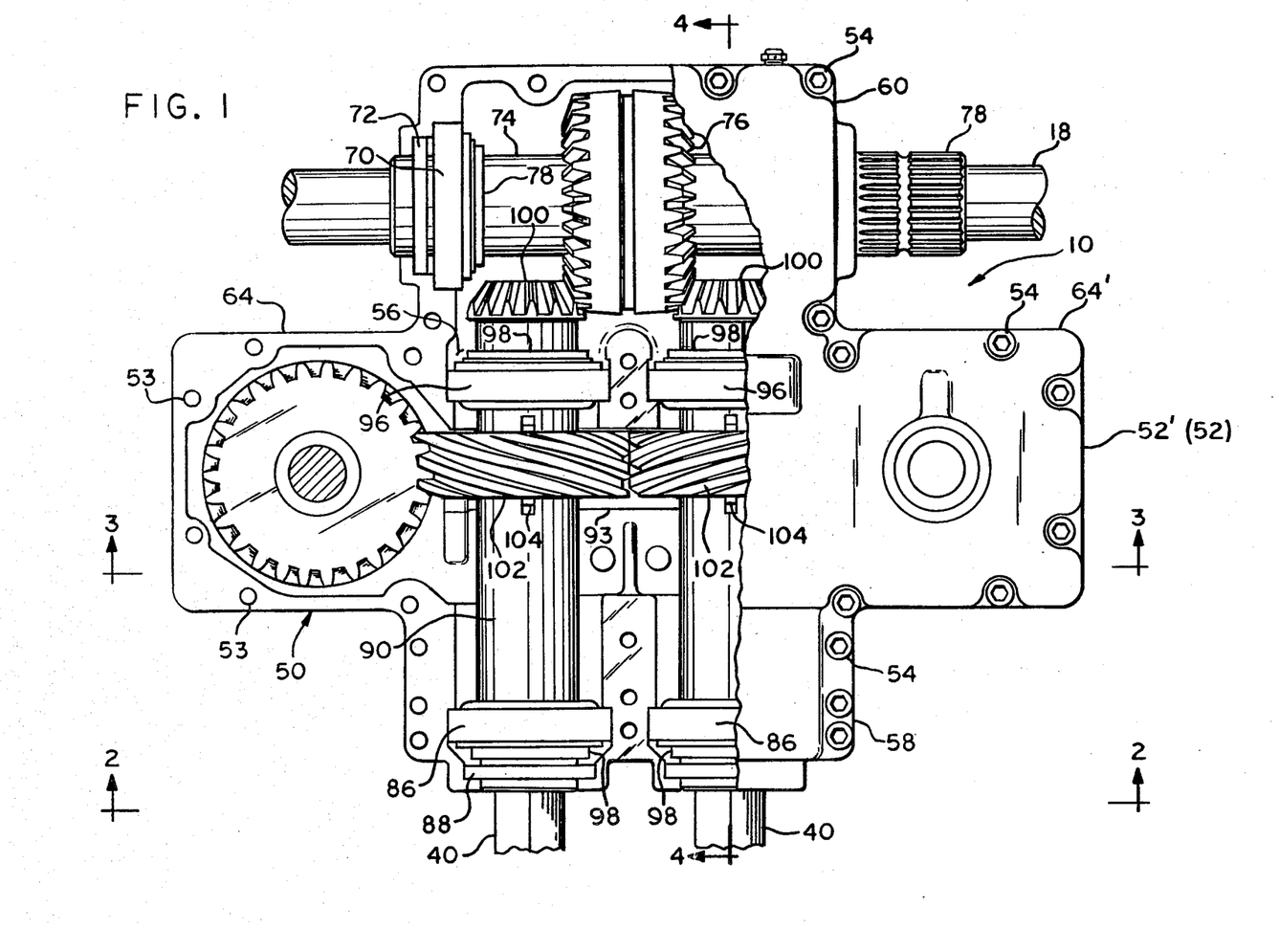
FIG. 1 is a plan view of the gear box cut away in part to show the interior mechanism.
Figure 2:
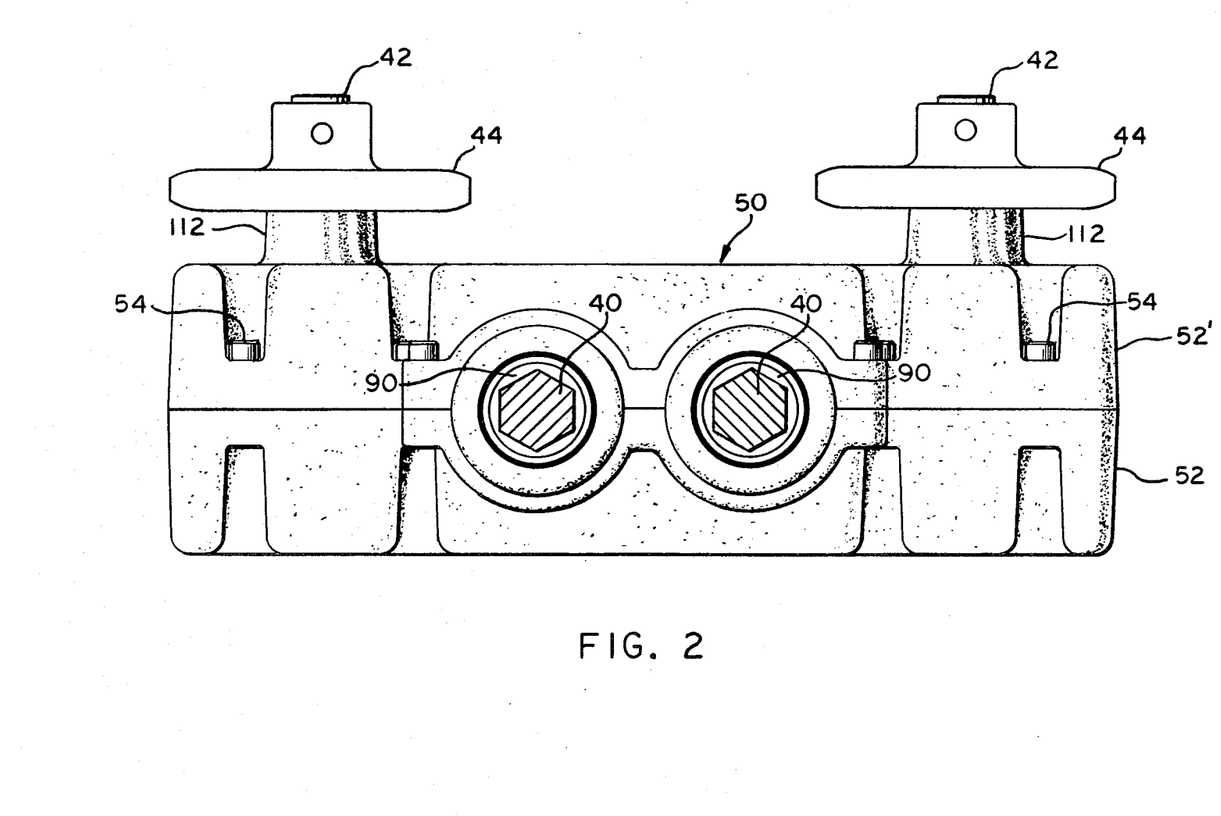
FIG. 2 is a front end elevational view taken on line 2—2 of FIG. 1.
Figure 9:
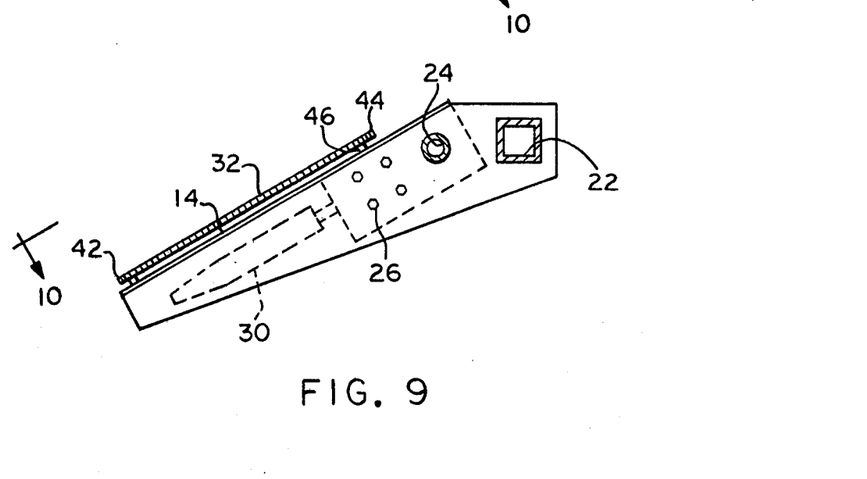
FIG. 9 is a simplified longitudinal elevational view showing the gear box used in conjunction with a corn harvesting unit.
Figure 10:
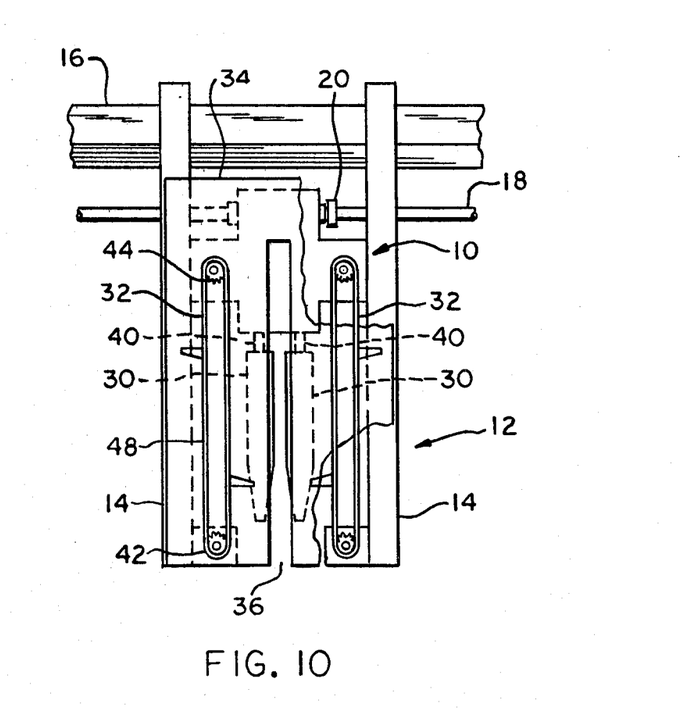
FIG. 10 is a simplified plan view taken on line 10—10 of FIG. 9.

Referring now by reference numerals to the drawings and first to FIGS. 1, 9 and 10 it will be understood that the gear box generally indicated by numeral 10 is intended for use with a corn harvesting unit of the type indicated by numeral 12.

As shown in FIGS. 9 and 10 in particular, the harvesting unit 12 is generally symmetrical about its longitudinal axis and includes a pair of oppositely disposed cantilever arms 14, formed from welded box sections or the like, mounted to and supported by a transversely extending beam 16 which forms part of a combine harvester corn harvesting attachment of which the corn harvesting unit forms a part. A transverse main drive shaft 18 also forms part of the corn harvesting attachment and is interconnected in drive relation to the gear box 10 by means of a clutch assembly 20. The cantilever arms 14 are provided with openings 22 and 24 receiving the transversely extending beam 16 and the drive shaft 18 respectively in sliding relation. The gear box 10, as shown, is received between and carried by the cantilever arms 14 and is connected to said arms as by bolts 26.

The harvesting unit 12, which is downwardly inclined in the operated condition as shown in FIG. 9, includes a pair of harvesting rolls 30 and a pair of gathering chain assemblies 32. Deck plates 34, shown cut away in part, extend between and are connected to the cantilever arms 14, said deck plates defining a slot 36, as shown in FIG. 10. As shown in FIG. 9, the deck plates 34 are disposed between the harvesting rolls 30 and the gathering chain assemblies 32 are conventional, and, in the usual way, the corn stalks are received within the slots 36 as the combine moves forward and the harvesting rolls 30 urge the corn ears upwardly. The corn ears are then urged rearwardly by the gathering chain assemblies 32 into an auger assembly (not shown) for transportation by the auger to a collection point on the combine.

The harvesting rolls 30 and the gathering chain assemblies 32 are both driven from the gear box 10. The harvesting rolls 30 are connected to shafts 40 which project outwardly from the gear box as shown in FIGS. 9 and 10 and are disposed in spaced parallel relation. The gathering chain assemblies 32, which are provided with idler sprockets 42 mounted at the remote end of the cantilever arms 14, are driven by sprockets 44 connected to the upper end of sprocket shafts 46, said shafts 46 forming part of the gear box 10. The sprockets 42 and 44 are interconnected by gathering chains 48. The component parts of the gear box 10 will now be more specifically described with reference to FIGS. 1 through 8.

Figure 8:
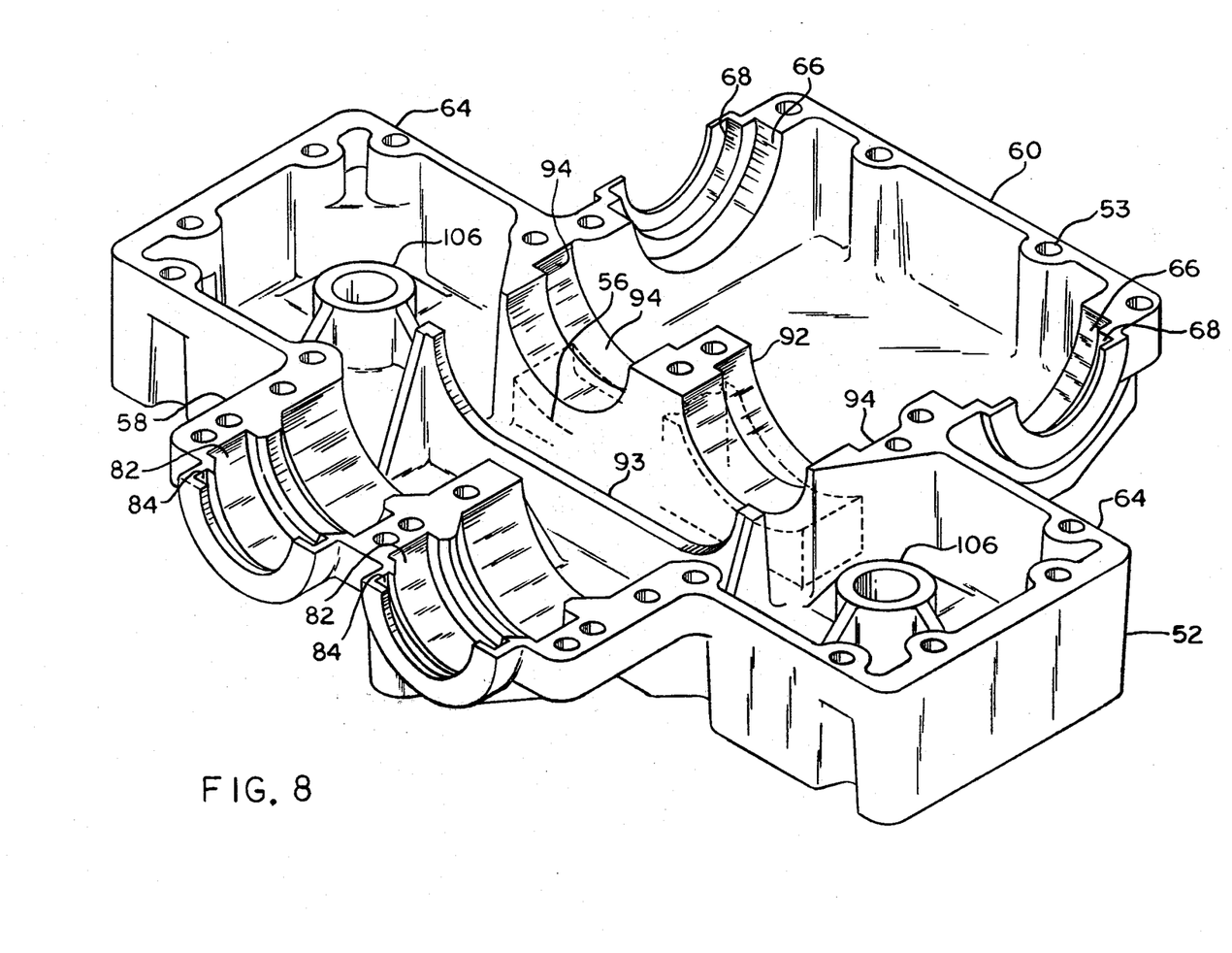
FIG. 8 is a perspective view of the gear box lower casing.

The gear box 10 is substantially symmetrical about its longitudinal axis and includes a gear case 50 of generally curciform configuration. The gear case 50 consists of upper and lower half portions 52 and 52', connected by a plurality of machine screws 54 received within openings 53, which are substantially identical except for the mountings of the sprocket shafts 46. For this reason, the lower half of the gear case 52 will be described initially, it being understood that, except as later noted, the parts of the gear case upper half are substantially identical. As shown in FIGS. 1 and 8 the gear case lower half 52 includes an intermediate or central portion 56, front and rear portions 58 and 60, and opposed transversely extending side portions 64. The rear portion 60 is provided with adjacent semi-circular grooves 66 and 68 to receive bearings 70 and seals 72, respectively, which mount a hollow, gear box drive shaft 74. The shaft 74 carries a double bevel gear 76 intermediate its ends, constituting bevel gear means, and one end of the shaft is provided with a conventional clutch connection 78. The shaft 74 is grooved adjacent the bearings 70 and adjacent the bevel gear 76 to receive retainer rings 80. The main drive shaft 18 is received within the hollow shaft 74 and is drivingly connected thereto by the clutch mechanism 20.

The gear case front end 58 is provided with spaced, semi-circular grooves 82 and 84 to receive bearings 86 and seals 88 respectively, with support the front ends of hollow, longitudinally extending shafts 90 disposed in spaced parallel relation and constituting a first pair of shafts. The intermediate gear case portion 56 includes a transverse wall 92 which is provided with semi-circular grooves 94 receiving bearings 96 which support the rear ends of the shafts 90. This arrangement provides that the shafts 90, which are disposed substantially within the gear case 50, are supported at two points along their length. Each of the shafts 90 is grooved at each end adjacent the bearings 86 and 96 to receive retainer rings 98. A stiffening rib 93 is disposed forwardly of the wall 92.

Figure 3:
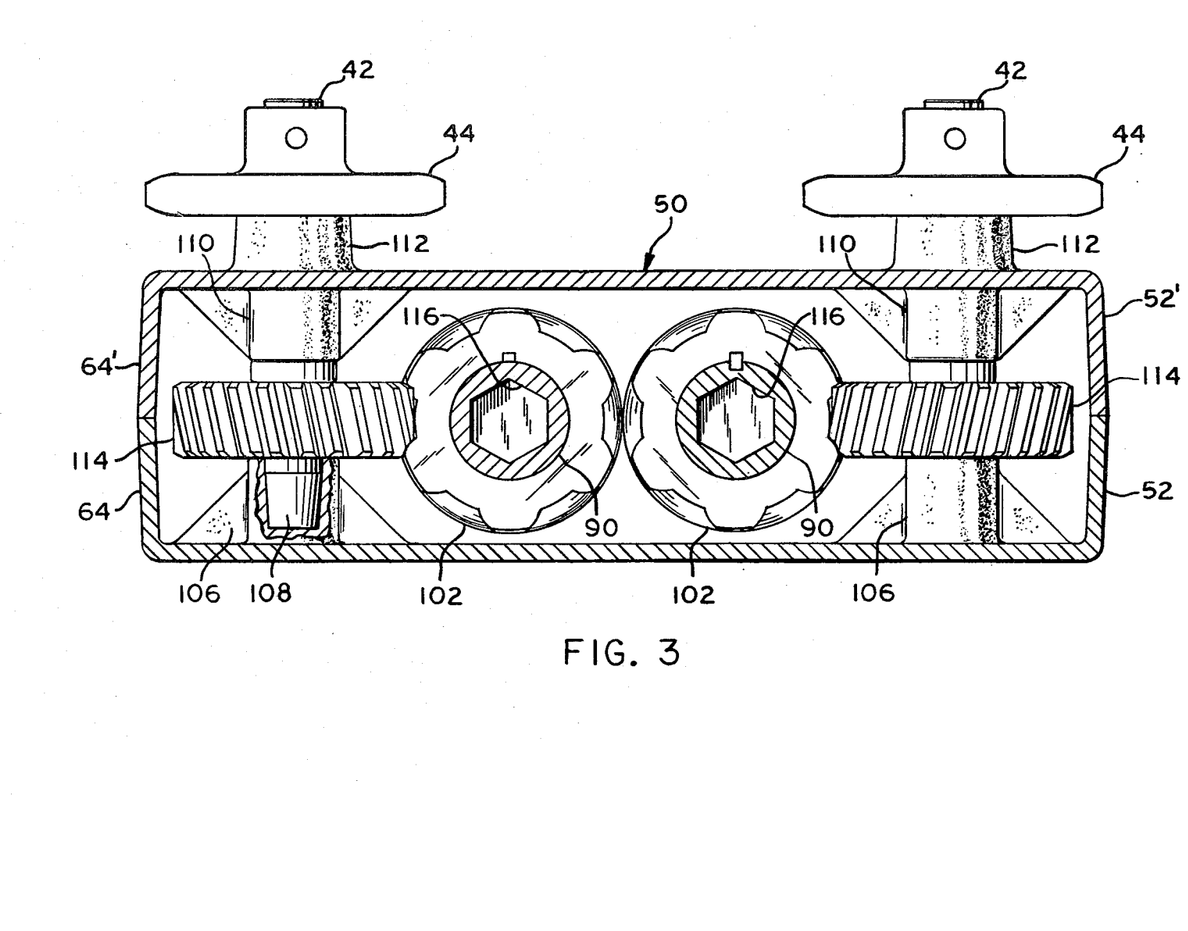
FIG. 3 is a cross-sectional view taken on line 3—3 of FIG. 1.
Figures 4, 6, 7:
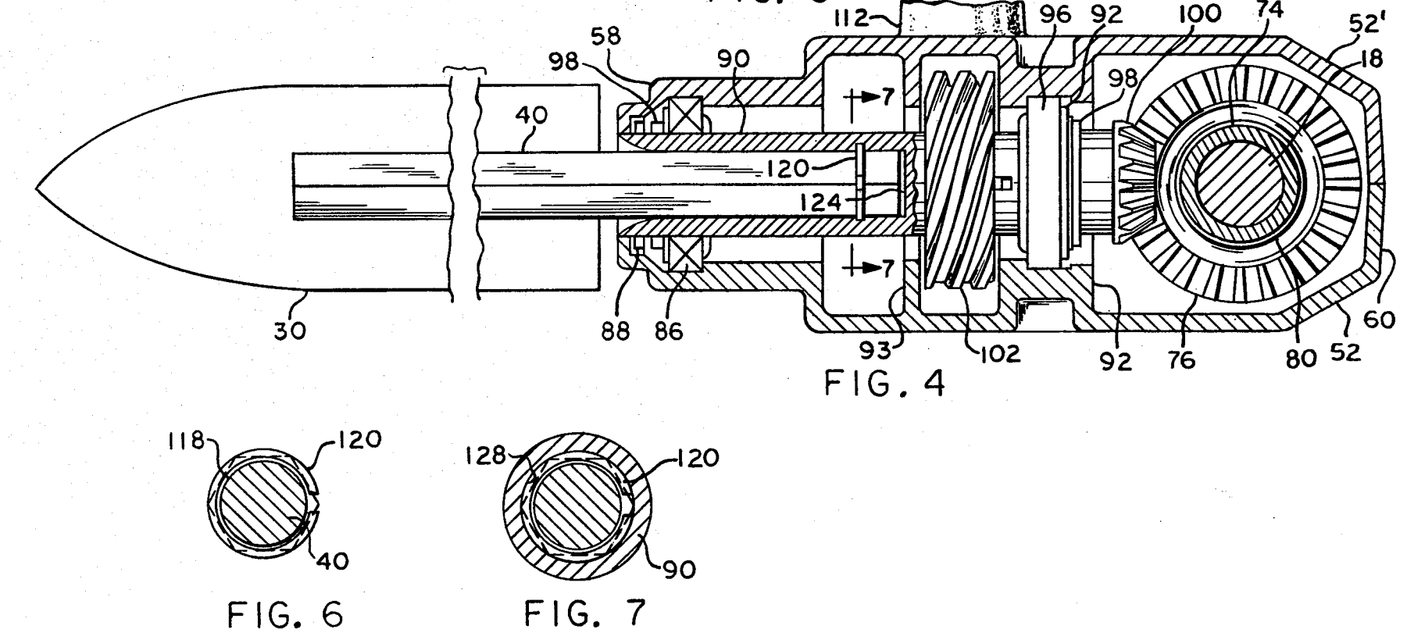
FIG. 4 is a longitudinal sectional view taken on line 4—4 of FIG. 1.
FIG. 6 is a cross-sectional view taken on line 6—6 of FIG. 5.
FIG. 7 is a front elevational view taken on line 6—6 of FIG. 5.
Figure 5:
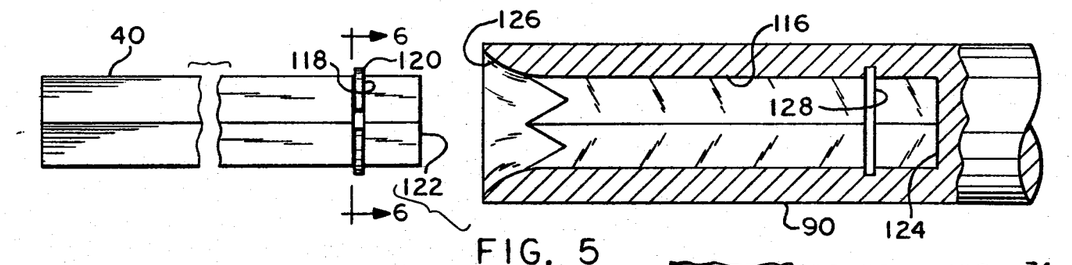
FIG. 5 is an exploded longitudinal sectional view showing the harvester roll shaft removed from the gear box.

Each of the shafts 90 includes a bevel pinion gear 100, constituting bevel gear means, at the inner end engageable with the transverse shaft double bevel gear 76 and each shaft carries a helical worm gear 102, constituting a worm gear means, attached thereto as by keying, said gear 102 being disposed between the transverse wall 92 and the rib 93. In the embodiment shown the worm gears 102 are spaced apart a distance less than their overall diameter to minimize the width of the gear case 50. As best shown in FIGS. 3 and 8, the gear case lower side portions 64 each include an inner mounting boss 106 having a tapered inner surface receiving and supporting the tapered lower end 108 of sprocket shafts 48 in rotatable relation. The gear case upper side portion 64' also includes an inner mounting boss 110 receiving the sprocket shaft 42 in rotatable relation, but said upper side portions 64' are different from said lower portions 64 in that the inner mounting boss 110 is bored through and aligned with an outer mounting boss 112. As also shown in FIG. 3, the gathering chain assembly sprocket 44 is attached to the upper end of the shaft 46 as by keying. A worm wheel 114, constituting a worm wheel means, is mounted intermediate the ends of the shaft 46 and attached thereto as by keying, said worm wheel 114 being drivingly engageable by an associated worm gear 102 attached to each of the longitudinal shafts 90.

The cruciform configuration of the gear box 10 renders it particularly compact and lightweight. In addition, the compactness is further enhanced by the arrangement of shafts and gears within the gear case 50. In particular, the parallel longitudinal shafts 90 are drive connected to the transverse hollow shaft 74, which is clutch-connected to the main drive shaft 18, by bevel gears 76 and 100, and axes of said shafts 74 and 90 lying in a common plane to provide a single tier of shafts. The longitudinal shafts 90 directly drive the harvesting roll shafts 40; in addition, by virtue of the worm gear 104 attached to shafts 90, and the worm wheels 114 attached to the shafts 46, shafts 90 also indirectly drive the gathering chain assemblies 32. This dirve arrangement provides essentially a single-tier drive system for both the harvesting rolls and the gathering chain assemblies 32.

In the embodiment shown, the double bevel gear 76 is provided with thirty (30) teeth and the bevel pinion gears 100 with fifteen (15) teeth giving a velocity ratio between the main drive shaft 18 and the harvesting rolls of 1:2. The worm gear 102 is provided with three (3) threads and the worm wheel with twenty-two (22) teeth providing a velocity ratio between said gear and wheel of 3.8:1. This arrangement provides an overall velocity ratio between the drive shaft 18 and the gathering chain sprocket shaft 42 of 1.9:1. These proportions provide that compatible gathering chain linear velocity and harvesting roll angular velocity can be readily effectuated.

As shown, particularly in FIGS. 4 through 8, the hollow shafts 90 are configured on the interior surface to provide a passage 116 which receives a harvesting roll shaft 40. Because of the two-point support of the hollow shafts 90, provided by the front and rear bearings 86 and 96, best shown in FIG. 4 and the extensive lengthwise support offered to the harvesting roll shafts 40 by the deep passages 116, transverse load applied to said harvesting rolls is transferred to the gear case 50 through the longitudinally spaced bearings, resulting in considerably reduced forces on the shafts 40 and the shafts 90 which receive them, than would be the case with a single support point.

In the preferred embodiment the passages 116, and at least the portions of shafts 40 received therein have a non-circular cross-sectional configuration of equal side polygons, for example hexagonal configuration. The shafts 40 are each provided with an exterior groove 118, outwardly spaced from the shaft end 122, mounting a retainer ring 120. The passage 114 includes an end wall 124 at the inner end and is formed into an inwardly converging mouth portion 126 at the remote open end. Intermediate the ends, the passage 114 includes an interior groove 128 which is spaced from the passage end wall 124 a distance substantially equal to the distance from the shaft end 122 to the shaft groove 118.

When a shaft 40 is inserted into an associated passage 116, the converging mouth portion engages the retainer ring 120 circumferentially so that the ring is radially contracted to permit it to be slidingly received within said passage. When the shaft end 122 closely approaches the end wall 124, the retainer ring 120 expands outwardly into the passage interior groove 124 and thereby aligns and connects the shaft 40 relative to the hollow shaft 90. In effect, the shafts 40 with the retainer ring arrangement shown, provide a connection means between the harvesting rolls 30 and the hollow gear box shafts 90. Further, the non-circular configuration of the connected shafts 40 and 96 provides means restraining the shafts against relative rotational movement while the retainer ring 120 provides means restraining the shafts against relative longitudinal movement.

As shown in FIG. 8, when the retainer ring 120 is expanded, the edges engageable with the groove 128 are effectively engageable with a plurality of arcuate areas 130 defined by the hexagonal passage flat and the expanded groove retainer ring 120. In the embodiment shown, the unrestrained outer diameter of the retainer ring is less than the diameter of the circumscribing circle of the harvesting roll corners so that the arcuate engagement area is relatively small.

Because of the close proximity between the shaft 122 and the end wall 124, said end wall provides a stop means, which relieves the retainer ring 120 of excessive inward longitudinal applied force, which is the primary force received by the shaft during the operation of the corn harvester unit 12. Further, because of the relatively small engagement between the retainer ring 120 and the interior groove 128 and because of the flexibility of the ring 120 in the direction of the shaft longitudinal axis, the application of sufficient outward longitudinal force, forces the ring 120 to contract into the shaft groove 118 thereby facilitating removal of the shaft 40.

It will be understood that the gearbox 10 can be used in conjunction with harvesting roll shafts of various types and configuration. As discussed above, the particular harvesting roll shafts 30 are connected to the hollow shaft 90 by means of retainer rings but this is not limited to use with this particular connection.

We claim as our invention:

1. A compact gear box for a corn harvesting unit of the type having a pair of longitudinally extending harvesting rolls and a pair of gathering chain assemblies, the gear box comprising:
   (a) a gear case including front and rear end portions and opposed side portions,
   (b) a drive shaft having an axis of rotation transversely disposed to the axes of the harvesting rolls, said drive shaft being rotatively mounted in the rear end portion of the gear case and having bevel gear means mounted thereon for rotation therewith,
   (c) a first pair of shafts rotatively mounted in spaced parallel relation within the gear case, said first shafts having axes of rotation longitudinally aligned with associated axes of the harvesting rolls, each of said first shafts including:
      1. a rear end provided with bevel gear means drivingly engageable with the bevel gear means of the drive shaft,
      2. a front end, and
      3. an intermediate portion having worm a gear means mounted thereon for rotation therewith,
   (d) means connecting the harvesting rolls to the first shafts, and
   (e) a second pair of shafts mounted in spaced parallel relation within the gear case, said second shafts having axes of rotation transversely disposed to the axes of rotation of the harvesting rolls, each of said second shafts being mounted in one of said gear case side portion and including:
      1. a lower end supported by the gear case in thrust bearing relation,
      2. an upper end extending outwardly of the gear casing and connected to the gathering chain assembly, and
      3. an intermediate portion having a worm wheel means mounted thereon and engageable with the associated worm gear means of one of said first pair of shafts.

2. A compact gear box as defined in claim 1, in which:
   (f) the gear case front, rear and side portions define a generally cruciform configuration.

3. A compact gear box as defined in claim 1, in which:
   (f) the gear case includes upper and lower halves which are substantially identical except for the mounting of the second pair of shafts.

4. The compact gear box as defined in claim 3, in which:
   (g) the gear case lower half includes an inner mounting boss receiving and supporting the lower end of the second shafts, and
   (h) the gear case upper half includes inner and outer mounting bosses receiving the second shafts therethrough.

5. A compact gear box as defined in claim 1, in which:
   (f) the worm gear means of the first shafts and the worm wheel means of the second shafts are of substantially the same diameter.

6. A compact gear box as defined in claim 1, in which:
   (f) the longitudinal axes of the worm gear means of the first shafts are spaced apart a distance less than the overall diameter of said worm gear means.

7. A compact gear box as defined in claim 1, in which:
(f) the first shafts include a longitudinal passage and are supported at longitudinally spaced points of support withing the gear case, and
(g) the means connecting the first shafts to the harvesting rolls include a pair of harvesting roll shafts received by the passage of the first shafts.

8. A compact gear box as defined in claim 7, in which:
(h) the first shafts are disposed substantially within the gear case.

9. A compact gear box as defined in claim 7, in which:
(h) the drive shaft bevel gear means includes a double bevel gear.

10. A compact gear box as defined in claim 1, in which:
(f) the velocity ratio between the drive shaft and first shafts is substantially 1:2.

11. A compact gear box as defined in claim 1, in which:
(f) the velocity ratio between the drive shafts and the second shafts is substantially 1.9:1.

12. A compact gear box as defined in claim 1, in which:
(f) the drive shafts and the first shaft lie in a common plane to provide a single tier of shafts driving the second shafts.

* * * * *